United States Patent
Kanduri et al.

(10) Patent No.: US 8,464,339 B2
(45) Date of Patent: Jun. 11, 2013

(54) METHOD FOR PASSWORD BASED AUTHENTICATION TRUST GENERATION AND AUTHORIZATION THEREOF

(75) Inventors: Tiruvengalam Kanduri, Hyderabad (IN); Ashutosh Saxena, Rajasthan (IN)

(73) Assignee: Infosys Technologies Limited, Karnataka (IN)

( * ) Notice: Subject to any disclaimer, the term of this patent is extended or adjusted under 35 U.S.C. 154(b) by 594 days.

(21) Appl. No.: 12/539,703

(22) Filed: Aug. 12, 2009

(65) Prior Publication Data
US 2010/0064365 A1 Mar. 11, 2010

(30) Foreign Application Priority Data
Aug. 12, 2008 (IN) .......................... 1952/CHE/2008

(51) Int. Cl.
*H04L 29/06* (2006.01)
(52) U.S. Cl.
USPC .............. 726/21; 726/4; 726/5; 726/6; 726/7; 726/17; 726/18; 726/19
(58) Field of Classification Search
USPC ........................................ 726/21, 4–7, 17–19
See application file for complete search history.

(56) References Cited

U.S. PATENT DOCUMENTS
6,148,406 A * 11/2000 Weisz et al. ..................... 726/18

OTHER PUBLICATIONS
Shamir—ACM vol. 22—1979.*

* cited by examiner

*Primary Examiner* — Jung Kim
*Assistant Examiner* — Tri Tran
(74) *Attorney, Agent, or Firm* — Michael Best & Friedrich LLP (57) ABSTRACT

A method and system is provided to authorize a user to access in a service of higher trust level. The method includes the steps of defining first password, assigning a second password to a user, generating a value for each constituent of second password on operating an exclusivity relationship, calculating the score for the second password on summing the generating value, combining trust levels of multiple users to attain a higher trust level in aggregate, and obtaining access in a service if the aggregated trust level of users are equal to or more than the predetermined trust level of the service. The present technique provides flexibility of authenticating and authorizing a user to access in a service to perform desirable functions thereon. The present technique eliminates the requirement of tokens, pins, dongles etc. while attaining a higher trust level to perform a task which belongs to a higher trust level.

20 Claims, 7 Drawing Sheets

METHOD FOR PASSWORD BASED AUTHENTICATION TRUST GENERATION AND AUTHORIZATION THEREOF

BACKGROUND OF THE INVENTION

1. Technical Field of the Invention

The present technique relates in general to a method and a system for authorizing an authenticated user to access in a service of higher trust level and performs the desirable actions, and more particularly a method and a system for attaining a higher trust level on the basis of passwords provided to the users and enabling access in the service to perform the desirable actions thereon.

2. Description of the Related Arts

In an environment of multiple users in a computerized system, say in an organization, security to access in a system and perform desired action thereon has always been a foremost concern. The requested user is authenticated by comparing the user's credentials e.g., ID, password etc. stored in the database of the system of the organization. Every authenticated user is authorized to execute the authorized tasks. Since an organization has plenty of data and the relevant actions to perform thereon, it is desirable to control who has what kind of access to what kind of data to perform what kind of actions. Usually, the accessibility of the type of data is controlled by providing a minimum threshold value to the type of data. If the credentials provided by the authenticated user comprises equivalent to or more value than the assigned threshold value of the type of the data, access to the data is allowed otherwise the access to the data is denied.

Generally, a login ID and password is provided as a credential element where a password is a sequence of alphanumeric characters known only to an authenticated user that can be entered on a keyboard. Upon authentication after entering the credentials using keyboard, the user is authorized to perform predetermined certain actions.

However, under some circumstances, an authenticated user is desired to execute some tasks for which the access is not allowed to him. Various solutions have been provided to enable a user perform a task for which initial access is inhibited. One of the solutions is to provide additional PIN number to the user. To access such unauthorized data, the authenticated user is required to enter PIN number in the system, which in turns, enhance his overall credential values. Once the credential value exceeds the threshold value of data, the access is allowed otherwise access in denied. However, it requires a user to remember multiple objects i.e., password and PIN which may create the state of confusion and also there is more likelihood of forgetting any one the objects. In another solution, the user is provided a physical device which generates a number on initiation. When the user inputs generated information in the system, it enhances overall credibility value. Thereafter, if the credibility value exceeds threshold value of data, access is provided otherwise access is denied. However, there is always a possibility of missing device. In yet another solution, a messaging system is used where an authenticated user request the system to provide access to him. In response to it, the system validates the requester and sends a message to the mobile/mail/other system of the user where the message is embedded with information to access the requested service and method of use of it. However, in this technique, the accessibility to the requested services essentially depends on external sources i.e., mobile/mail system, speed of transfer of message and other related activities.

Therefore, a system and method is required where an authenticated user can be authorized to access a service and perform the desirable tasks for which he is not permitted to access and forbidden to execute the desirable tasks thereof.

BRIEF DESCRIPTION

The present technique is directed to a method and a system to authorize an authenticated user, in multiple users' environment, to access a service of higher trust level and execute a performable function wherein the authenticated user desiring to access in the service to perform the desired functions is not empowered initially. The access of every service and execution of the functionalities thereof is associated with a predefined trust level thereon. According to one embodiment of the present technique, the method includes a first password, also termed as master password, where the master password is predefined by the system. Also, each element of the master password has an associated pair of the sub-elements. Further, every authenticated is provided with a login identification (ID) and a password by the system. Also, every authenticated user is provided with a trust level. If the authenticated user requesting to access in the service and to perform the desirable tasks thereon provides equal to or more trust level than the assigned trust level to the service, access is provided else access is denied. The constituents of second password (or the user's password) comprise few selected sub-elements which are associated with elements of master password. From a pair of sub-elements associated with elements of master password, one sub-element can be provided for utilizing as a constituent in second password while the respective another sub-element will be stored in a storage database of the system. Further, the constituents of the second password are operated upon an exclusivity relationship. A numerical value "1" one is generated if the exclusivity relationship is 'true' for the constituent; otherwise a value of 'zero' is generated if the exclusivity relationship is 'false' for the constituent of the second password and generating a score for the second password thereafter.

Subsequently, the generating of score for the second password is obtained by summing the generated value for each constituent. To attain a higher trust level, the intended authenticated user is required to request other authenticated users to allow the method to combine the trust level provided to them. On approval of the other requested authenticated users, an aggregated higher trust level is attained thereof. The trust level obtained by combined authenticated users' is compared with predetermined threshold trust level of the service for which request to access is processed. If the aggregated trust level of users is less than the predetermined threshold trust level of the service, access in the service is denied.

The method further comprises evaluating the number of users requesting to combine in desire of attaining a higher trust level since the maximum numbers of authenticated users requesting to attain higher trust level and accessing in the service is defined. If the number of authenticated users requesting to attain a higher trust level is equal to or less than the defined number of authenticated users, access in to the service is provided which wherein the access in the service enables an authenticated user to perform various actions thereon. If the number of authenticated users requesting to attain a higher trust level is exceeding the predefined number of authenticated users, access in to the service is rejected.

In multiple users' environment, the present technique also relates to a system of authorizing an authenticated user to access a service of higher trust level and execute a performable function wherein the authenticated user desiring to access in the service to perform the desired functions is not empowered initially. The access in every system of the service and executing desirable functionalities thereof is associated with a predefined trust level thereon. According to one embodiment of the present technique, the system is configured to provide a first password, also termed as master password. Each element of the master password has an associated pair of the sub-elements which are stored in a suitable database of the system. Further, the system also provides login identification (ID) and second password (also termed as user's password) to each authenticated user. Also, every authenticated user is attributed with a trust level as defined by the system. If the authenticated user requesting to access in the service and to perform the desirable tasks thereon provides equal to or more trust level than the assigned trust level to the service, access is provided else access is denied. From a pair of sub-elements, the system provides a sub-element being utilized as a constituent in second password while the respective another sub-element will be stored in a storage database of the system. Further, a module of the system is configured to operate upon the exclusivity relationship for the constituents of second password. A numerical value "1" one is generated by the system if the exclusivity relationship is 'true' for the constituent; otherwise a value of 'zero' is generated if the exclusivity relationship is 'false' for the constituent of the second password and generating a score for the second password thereafter.

Subsequently, a module for generating of score for the second password is configured to obtain the score on summing the generated value for each constituent. Further, to attain a higher trust level, a module of the system is configured to assist the intended authenticated user to request other authenticated users combine with him for attaining a higher trust level. On approval of the other requested authenticated users, a module of the system is configured to attain an aggregated higher trust level thereof. A module of the system is further adapted to compare the aggregated trust level provided by the intended user with predetermined threshold trust level of the desirable service for which request to access is processed. If the aggregated trust level of the intended user is lesser than the predetermined threshold trust level of the service, access in the service is rejected.

The system further comprises a module configured for evaluating the number of users requesting to combine in desire of attaining an aggregated higher trust level wherein the maximum numbers of authenticated users requesting to attain aggregated higher trust level for accessing in the service and performing functions thereof is predefined. If the number of authenticated users requesting to attain a higher trust level is equal to or less than the defined number of authenticated users, access in to the service is provided which wherein the access in the service enables an authenticated user to perform various actions thereon. If the number of authenticated users requesting to attain a higher trust level is exceeding the predefined number of authenticated users, access in to the service is rejected.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the systems and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As will be appreciated by people skilled in the, to best understand the present invention it is important to be familiar with the definition in which it is used:

"Server" includes a server application or applications, including application server, web server, and other necessary hardware or software components, to facilitate secure access to the server.

"Service(s)" or "application(s)" or "task(s)" or "action" or "function(s)" represents any-type of contents or data or information of actions or websites or other features, wherein an authenticated user is authorized access them and performs relevant activities accordingly.

The authenticated process or authenticated method determines accessibility for a desired user in a protected network of an organization.

The authorization process or authorization method determines which sites, contents, data or other features the authenticated user can access "Authenticated user" in the present technique refers to any person or entity wherein the authenticated user is provided with a login identification (any alphanumeric value or card or any other component which helps in recognizing a user) and password (any alphanumeric value or pin number or any other component which helps in recognizing a user), and the authenticated user is allowed to access a protected network of an organization. In the present technique, the authenticated user is also termed as "user(s)" for simplicity.

In the present technique, a "user(s)" in the process of authorization of accessing a service represents an "authenticated user" who is permitted to access certain services or applications (e.g., web-based applications, non-web-based applications, hardware/software based, etc.) or networks of an organization.

"Authorized user" is an authenticated user (or the user in the present technique) who is allowed to perform tasks enabled to him on the basis of trust level attributed to him.

The "trust level" or "trust value" of a user represent a numeral value (or a percentage value) attributed to him which enables him to execute various functions enabled for that level of trust value.

The "trust level" or "trust value" for a "service(s)" or "application(s)" or "task(s)" or "action" or "function(s)" represent the predetermined threshold value (in "numeral value" or "percentage value") defined for it The present techniques relates to authorizing a user to access in a service of higher trust value and executing the functions thereon. The present technique further offers the capabilities of assigning different second passwords for unauthenticated users (say new user or first time users), generating values for the constituents of second password, and calculating scores of it thereof. The present technique further provides capabilities of differentiating authenticating a user and authorizing a user. The authenticating of a user involves allowing him to enter into the network of the organization, while authorizing a user allows the authenticated user to access in a service and execute the desirable functions thereof. The present technique further provides flexibility by allowing multiple users to combine trust level and attain higher trust level in aggregate thereof, and providing access in the service of higher trust levels thereof. The present technique further offers capabilities of verifying number of authenticated user requesting to combine trust level to access in a service.

Figure 1:
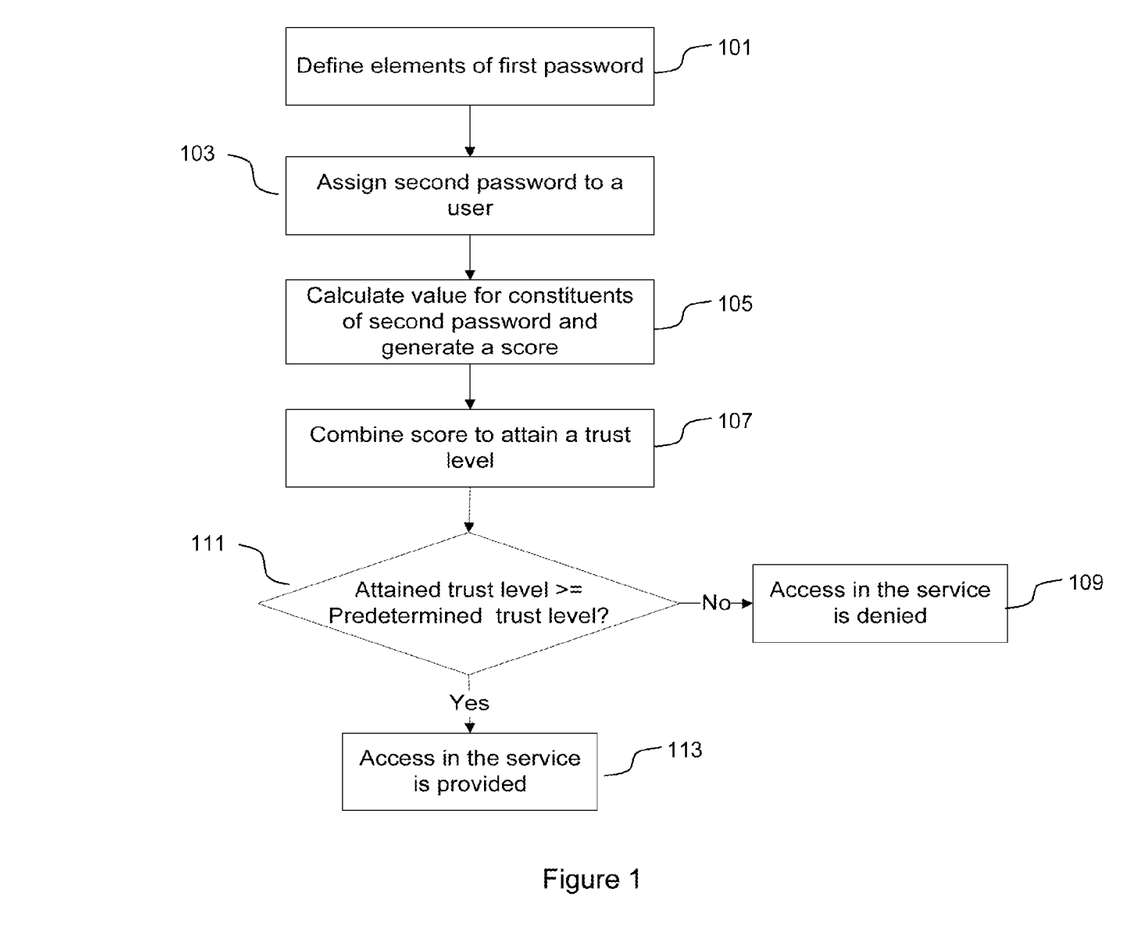
FIG. 1 is a flowchart illustrating method of accessing a service to perform desirable functions thereon in accordance with one embodiment of the present technique.

Referring to figures, FIG. 1 is a flowchart illustrating method of authorizing a user to access in a service and performing desirable function thereof in accordance with one embodiment of the present technique. The method starts with step 101 by defining elements of the first password (also termed as master password) and length of it thereof. The elements of the first password may be alphanumeric. Further, each element of the master password is further provided with a pair of sub-elements. For example, if master password comprises X1,X2,X3 . . . Xn elements, then the element X1 is further provided with a pair of sub-elements "d" & "f" thereof. The elements of the master password and the pairs of sub-element are stored in a suitable database of the system of the organization In step 103, a method of assigning second password to a new user and the method of authenticating him thereof is defined. The authenticated user is allowed to access in network of the organization and accessing various services and applications enabled for him wherein enabling of the access of the services depends upon the trust level attributed to him. The accessing of services authorizes the authenticated user to execute various functionalities applicable thereof. While assigning a second password to a new user, the level of authorization i.e., the trust-level is attributed on the basis role occupied by the user or the functionalities expected from him. According to one embodiment of the present technique, the level of the trust for a user is calculated by using an exclusivity relationship. The constituents of the second password comprise sub-elements from the pairs wherein the pairs of sub-element are described in reference of elements of the master password. The constituents of the second password can include selected number of sub-elements depending on the trust level being required to provide to the second user. The selection of pairs of sub-element depends upon the mapping of number of elements of the master password with constituents of the second password. For example, if five elements of the master password are selected randomly to map over to the number of constituents of second password, then the corresponding five pairs of sub-element are selected to provide five constituents of the second password wherein each pair provides one sub-element as a constituent of second password and the respective sub-element is stored in a suitable database of the system of the organization. Thereafter, value of each constituent of the second password is calculated using exclusivity relationship.

The next step 105 focuses on calculating the value of the constituents for second password. The exclusivity relationship is operated upon the each constituent of the second password using the respective sub-elements being stored in the database of the system of the organization. The operating of exclusivity relationship provides a "true" or a "false" result for each constituent of the second password. If the constituent of the second password being operated upon with exclusivity relationship is a sub-element, it will provide a "true" result; if the constituent of the second password being operated upon with exclusivity relationship is a not sub-element, it will provide a "false" result. For example, for an element X1 of the first password, the pair "d & f" are respective sub-elements. For example, as discussed above, from the pair of sub-elements "d" or "f", one sub-element, say "d", is included as a constituent in the second password, while the sub-element "f" is stored in a database of the system. On operating upon the exclusivity relationship (say "xor") on sub-element "d", a result "true" is being provided as the respective sub-element "f" is being extracted as one component for "xor" logic operation while other component for "xor" logic operation "d" is being extracted from the set of second password. For every "true" result, a value of "1" is provided, for every "false" result, a value "0" is provided. Thereafter, a score for the second password is generated. The score for a second password is generating by summing the value of each constituent of the second password.

According to one embodiment of the present technique, the exclusivity relationships discussed anywhere in the present technique are various types of logic operations, for example the logic operation "xor" as explained above or other logic operations such as simple addition or substation or average or etc.

While elaborating simple addition, let the master password element in consideration for mapping is 'a' and the associated pair of sub-elements are 'p' & 'q' wherein the element 'a' and the sub-elements 'p' & 'q' of the pair are assigned typically ASCII integral value. Let the sub-element 'p' is provided as a constituent of the second password and the sub-element 'q' is stored in a suitable database of the system. Let the function be so that 'p'+'q'='a'. This will mean that when the user enters 'p' as a constituent of second password, the system picks up 'q' from the database, the system converts 'p' & 'q' into integral values using typically ASCII value, then add up the integer value of 'p' and the integral value of 'q' and check if this matches with the integer value of 'a'. If it matches, then a value is given ' 1' for this constituent of the second password. Similarly, other logic operations such substitution or average etc., which are apparent to person skilled in the art, can also be used.

Further, according to one embodiment of the present technique, it provides flexibility of combining scores of different users and obtains higher trust level in aggregate thereof as shown in step 107, i.e., if a user is not able to access a desirable service because of insufficient trust level attributed to him, he may request other users to allow the process to combine their scores and acquires a higher trust level in aggregate. If the aggregated trust level of the users is equal to or more than the minimum predetermined threshold trust level for the desirable service, the access in the service is provided else the access in the service is denied wherein these processes are depicted in step 111, step 109 and step 113.

Figure 2:
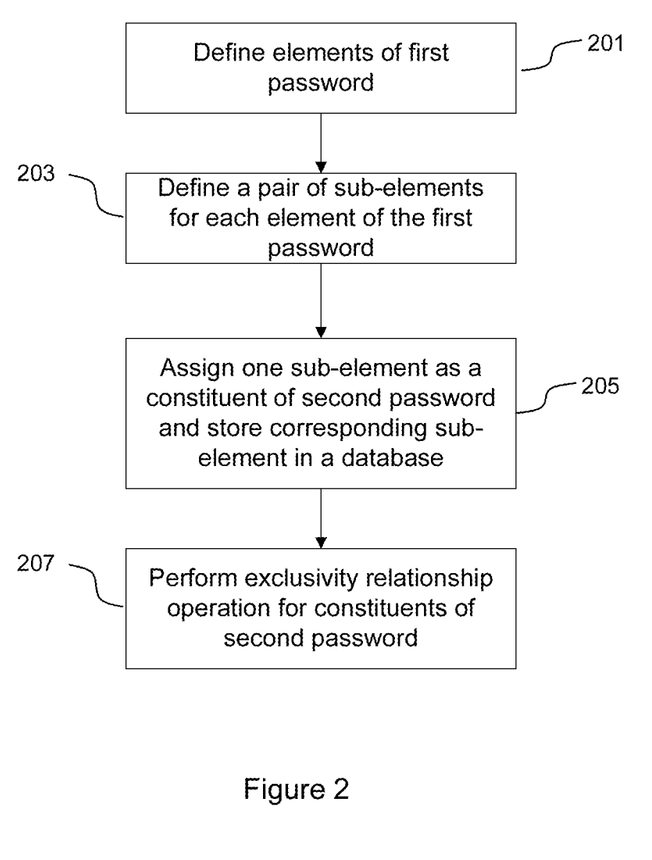
FIG. 2 is a flowchart defining contents of the first password and the second password in accordance with one embodiment of the present technique.

Moving to next figure, FIG. 2 is a flowchart defining contents of first password and second password in accordance with one embodiment of the present technique. Step 201 represents assigning of elements of first password. The first password, also termed as master password is defined. The master password comprises X1, X2, X3 . . . Xn number of elements wherein X1 represents first element, X2 represents second element, X3 represents third element, and Xn represents 'n'th number of element. The elements of the first password can be alphanumeric. For each element of the first password, a pair of sub-elements is also defined, e.g., pair of sub-elements "d & f" is defined for the element X1 as represented in step 203. An exclusivity relationship for a pair of sub-elements is also defined according to one embodiment of the present technique. On operating the exclusivity relationship, for example exclusivity relationship "XOR" herein, upon the pair of the sub-elements "d" & "f" wherein the sub-element "d" is being as a constituent of the second password and the sub-element "f" is stored in a suitable database of the system of the organization, the element X1 is derived and the result is termed as "true" and a numeral value "1" is generated for it thereof. In other words, for example, for sub-elements "d & f" for the element "X1", the method of operating the exclusive relationship is shown below:

d XOR f=X1; results=true; numeral value conferred: 1

As appreciated by the people skilled in the art, the "XOR" is one of the known exclusive relationships. Though the types of exclusive relationships applicable in the present techniques are not exhaustive, a few other exclusive relationships are simple addition or substation or average etc.

While elaborating simple addition, let the master password element in consideration for mapping is 'a' and the associated pair of sub-elements are 'p' & 'q' wherein the element 'a' and the sub-elements 'p' & 'q' of the pair are assigned typically ASCII integral value. Let the sub-element 'p' is provided as a constituent of the second password and the sub-element 'q' is stored in a suitable database of the system. Let the function be so that 'p'+'q'='a'. This will mean that when the user enters 'p' as a constituent of second password, the system picks up 'q' from the database, the system converts 'p' & 'q' into integral values using typically ASCII value, then add up the integer value of 'p' and the integral value of 'q' and check if this matches with the integer value of 'a'. If it matches, then a value is given ' 1' for this constituent of the second password. Similarly, other logic operations such substitution or average etc., which are apparent to person skilled in the art, can also be used.

In step 205, a unique second password is assigned to each new user and also a differential trust-level for the each user is attributed accordingly. The constituent of the second password of the user are alphanumeric. According to one embodiment of the present technique, a second password with higher number of the sub-elements encompasses a higher trust-level and while a second password with lesser number of password results in less trust level. Further, the exclusive relationship is operated upon the each constituent of the second password to compute value for it and generating the score on summing the value thereafter.

Figure 3:
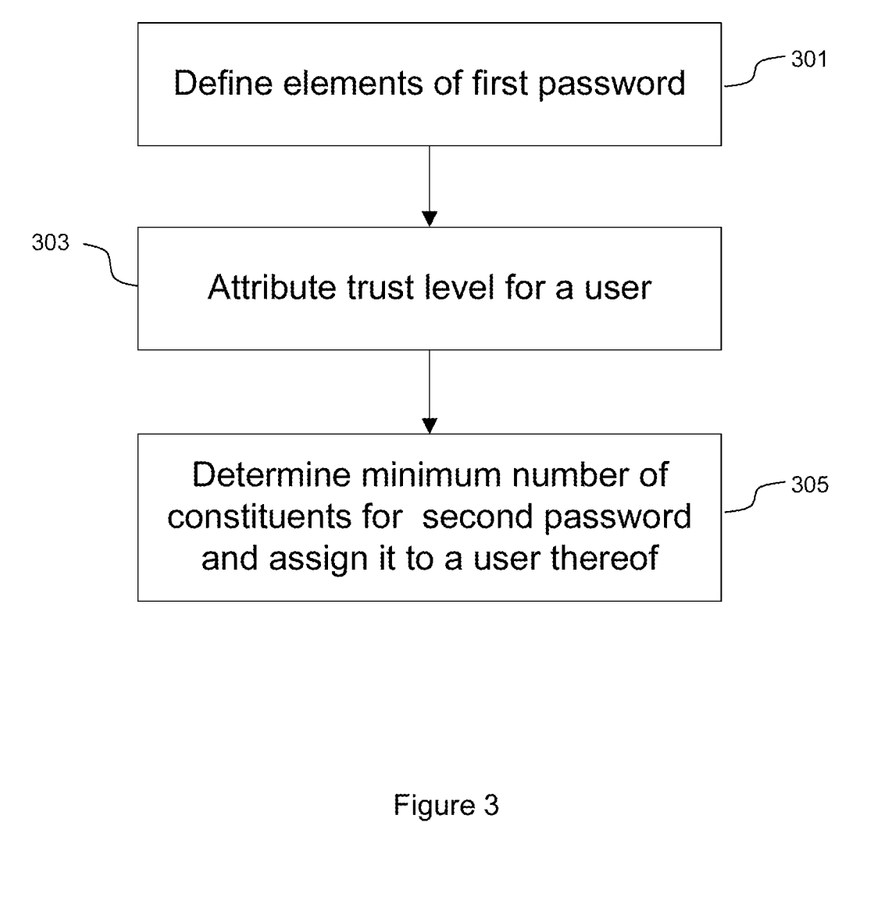
FIG. 3 is a flowchart explaining a method of determining attributes and length of second password in accordance with one embodiment of the present technique.

FIG. 3 is a flowchart explaining a method of determining attributes and length of the second password in accordance with one embodiment of the present technique. The step 301 shows defining elements of the first password. For example, the first password can contains elements X1, X2, X3, . . . Xn wherein X1 represents first element, X2 represents second element, X3 represents third element, and Xn represents 'n'th number of element wherein the elements can be alphanumeric. Further, each element of the first password is defined with a pair of sub-elements. Further, if a user is attributed with x % of trust-level wherein the first password is comprising 'n' number of elements, then the number of elements of the first password required to map-over the second password will be x*n/100. For example, if a user is attributed with 10% of relevancy wherein the total number of elements included in the first password are 20, the number of elements of the first password required to map-over the second password will be 2 (10*20/100=2) wherein these two elements of the first password are selected randomly. Also as described earlier, each element has an associated pair of sub-elements which is being utilized as constituent in the second password. Eventually, it indicates that two constituents of the second password are two sub-elements from the two pairs of sub-element (one sub-element from each pair of sub-element).

Figure 4:
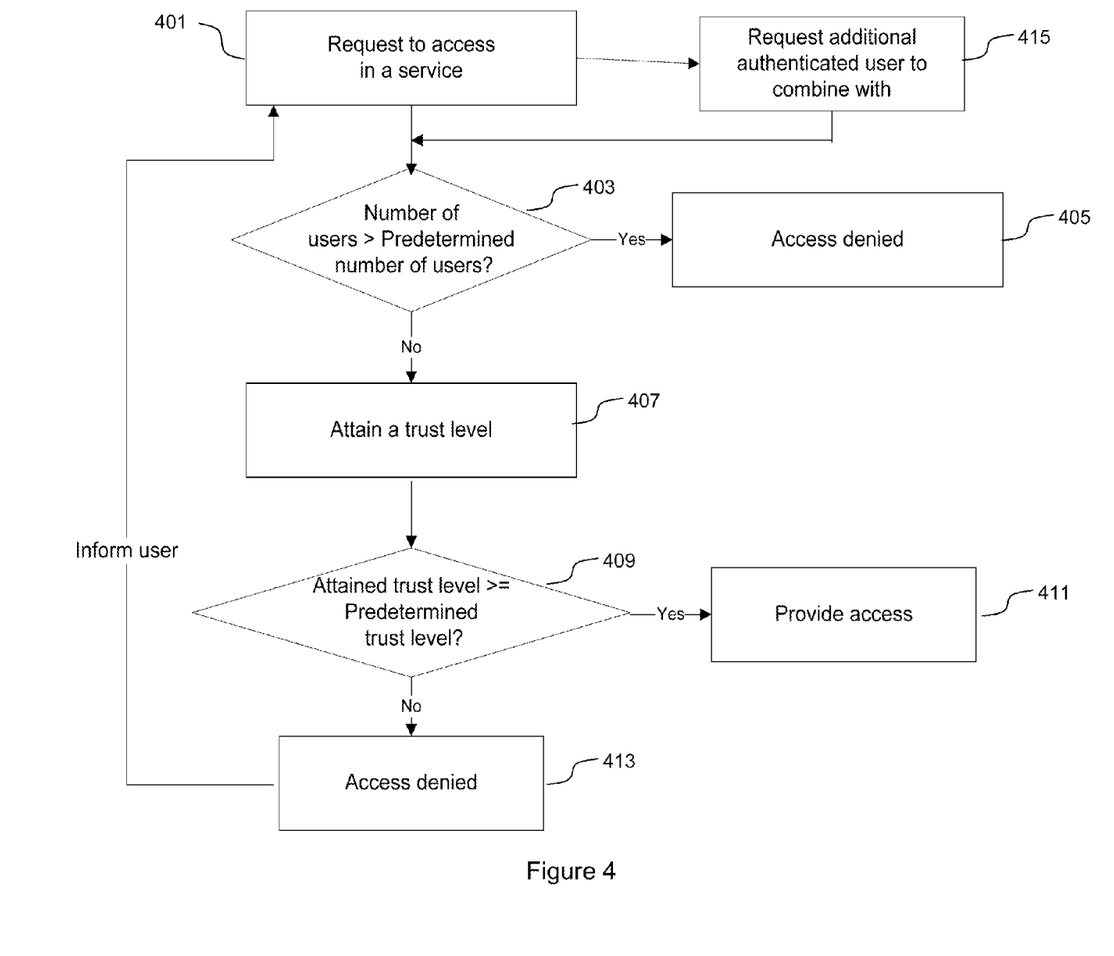
FIG. 4 is a flowchart illustrating a method of verifying number of requesting user desiring to attain a higher a trust level in accordance with one embodiment of the present technique.

FIG. 4 is a flowchart illustrating a method of verifying number of requesting user requesting to attain a higher trust level in accordance with one embodiment of the present technique. When a request to access in a service is solicited as represent in step 401, the process verifies the number of users requesting thereof as represented by 403. If the process ascertains that total the number of combined users are exceeding the allowable number of users, the process rejects further access process herein as step 405, else it proceeds to step 407 where combined trust level for all requesting user is attained as described in step 105 and step 107 in FIG. 1.

Further, according to one embodiment in the present technique, the trust value for a user or the rust value for a service can be defined in terms of numeral values or in terms of percentage value.

Further, as described earlier, a minimum trust level required to access in a service is defined. Also, a maximum number of users desiring to combine and obtain access in a service is also defined. For example, a minimum "30%" trust level is defined for a service 'A' to access and execute the desirable functions thereon. Also, a maximum "3" number of users are permitted to combine and request to access in the service 'A' is also defined. Therefore, if the number of all requesting users collectively is "3" or less, the request is allowed to proceed for next level (block 407). However, if the total counts of requesting users desiring to access in the service 'A' exceeds "3" i.e., "4" or more, the request to process to access is rejected (block 405).

Subsequently, a combined trust level, as represented in step 407, is attained on summing the individual score of each member user wherein the method of attaining a trust level is described in Step 103, Step 105, and Step 107 in FIG. 1. Consequently, the trust-level attained by the users collectively is compared with predetermined threshold trust level of the service, if the attained trust level of the users is equal to more than the predetermined threshold trust level of the service, access is provided, else access is denied as represented in Step 409, Step 411, and Step 413.

If the request of user(s) is denied (block 413), the user will be informed (the user can be informed through an email or by any other method as defined wherein the method of informing back to a user on failure of process is obvious to the person skilled in the art). Subsequently, the user requests other users to allow combining his trust level to attain a higher trust level in aggregate. Thereafter, process replicates the Step 403 to ensure allowable maximum number of user in the service, and thereafter the Step 407 and the subsequent steps are processed.

Reiteration of the step 403 through step 415 will take place till either the total number of combined member user exceeds the allowable number of member of joint users to attain high trust level which results into rejection of access (block 405), or access in the desirable service is obtained is provided, or the user abandons the process.

According to one embodiment of the present technique, the members of the requesting user may belong to different hierarchy/role or may belong to same hierarchy/role. Also, a user being requested to combine as additional user for attaining higher trust level can reject the request.

Figure 5:
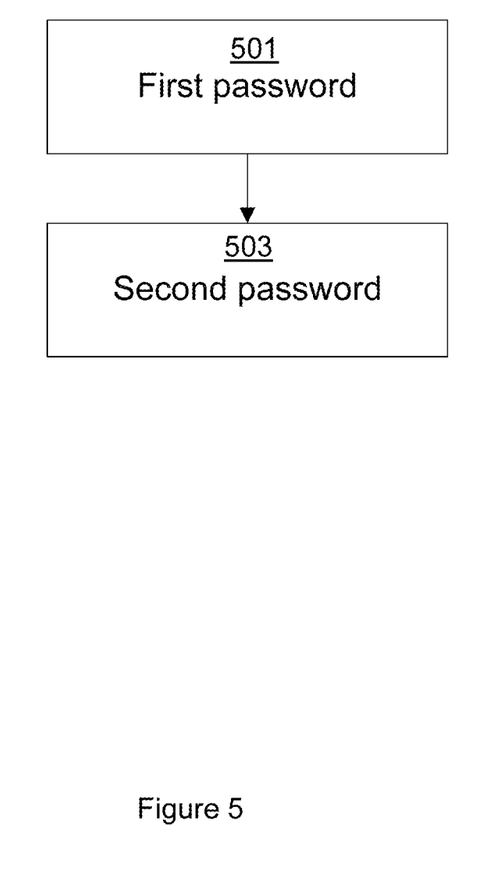
FIG. 5 is a block schematic diagram showing a first password and second password determining system in accordance with one embodiment of the present technique.

Moving to next diagram, FIG. 5 is a block schematic diagram showing a first password and second password determining system in accordance with one embodiment of the present technique. A module (block 501) is configured to define first password. The first password may contains elements X1, X2, X3, . . . , Xn wherein X1 represents first element, X2 represent second element, and so on. These elements are alphanumeric and stored in a database of the system. Further, each element is associated with a pair of sub-elements. For example, the element X1 is associated with a pair of sub-elements "d" & "f"; the element X2 is associated with a pair of sub-elements "g" & "h" and so on.

According to one embodiment of the present technique, a module (block 503) is configured to assign a second password to a new user wherein the module provides different passwords to different users each time. The password authenticates the user to enter into the network of the organization. Additionally, every user is defined with a trust level. For example, a user can be defined with 20% trust level while other user is provided with 35% trust level. Further, access in services and executing the proper functions thereon is associated with the trust level defined. For example, accessing in a service "A" requires minimum 15% trust level from a user while it requires minimum 33% from a desired user to access in a service "B". The second password is a key constituent in realizing the trust level for a user. Further, if a user is attributed with x% of trust-level wherein the first password is comprising 'n' number of elements, then the number of elements of the first password required to map-over the second password to obtain x % will be x*n/100. For example, if a user is attributed with 10% and the total number of elements included in the first password are 20, the number of elements of the first password required to map-over the second password will be 2 (10*20/100=2) wherein these two elements of the first password are selected randomly. Also as described earlier, each element has an associated pair of sub-elements which is being utilized as constituent in the second password. Eventually, it indicates that two constituents of the second password are two sub-elements from the two pairs of sub-element (one sub-element from each pair of sub-element).

Figure 6:
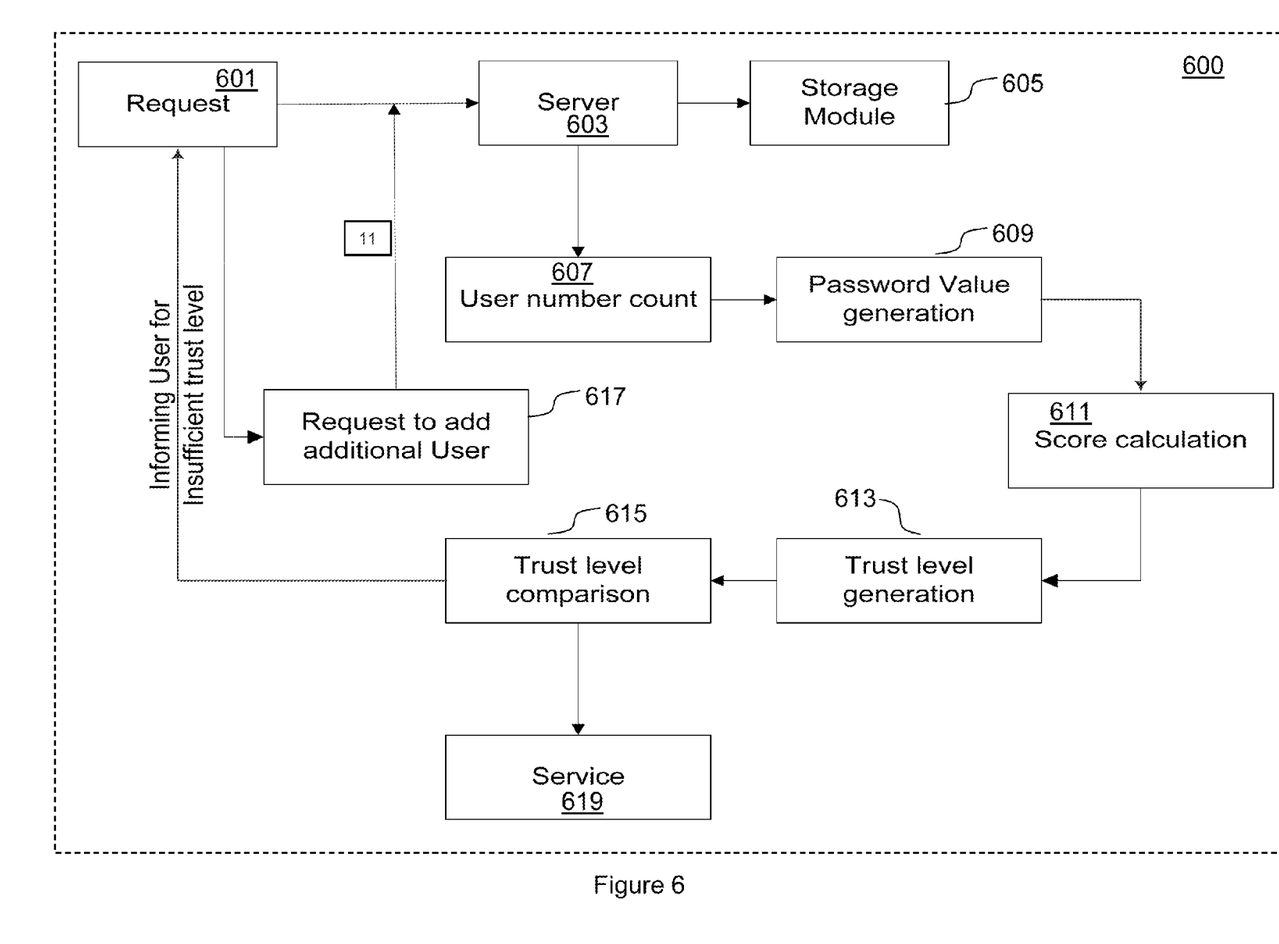
FIG. 6 is a block schematic diagram showing an authorization system in accordance with one embodiment of the present technique.

FIG. 6 is a block schematic diagram showing an authorization system 600 in accordance with one embodiment of the present technique. A requesting module 601 processes the request of a user to access in a desired service. The authorizing system 600 further comprises a server 603 which is connected through a network with other modules of the system as shown. The authorizing system 600 further comprising a storage module 605 wherein storage module comprises information about first password and second password. Also, unit 605 can be integrated into the server unit or can be a stand alone unit. Further, the server processes the request to a module 607 which is enabled to count number of requesting users. Also, the module 607 is further configured to analyze the maximum number of users are allowed to combine and to take the request for access in service further or deny thereof. For example, for a service application say "A", if it is predetermined that a maximum number of four people jointly can make a request to access therein. The module 607 is enabled to count the numbers of user jointly for requesting the access in the service "A". If less than five users jointly are requesting to access in the service, the module 607 takes the process for next step of generating the value of second password each for each user, however, if the jointly requesting users are more than four in count, for present example, the module 607 denies the request to take the step for next level i.e., to generating the value of second password each for each user. Further, the module 607 sends information to the user if the system has denied his request for the reason discussed herein.

The password value generating module 609 calculates value for each constituent of the second password on implementation of exclusive relationship thereon. This will generate a value of "0" or "1" for each constituent of the second password. The authorization system 600 further comprises a score calculating unit 611. The score calculating unit 611 configured to obtain score for each second password. The score for each password is obtained on summing the value of each constituent of the second password. The password value generating module 609 and the score calculating module 611 are independent stand alone units or can be integrated single unit as perceived to the people skilled in the art. The trust level generating unit 613 combines the scores of each second password of the each user of the jointly requesting users and provides a total scores and a combined trust level thereof. The trust level comparison unit 615 compares the trust level of the users and the predetermined trust level of the service in which the access is desired. On comparison, if the trust level of the users finds equal to or more than the predetermined trust level of the service, an access in the desired service is provided. If the trust level of the users is lesser than minimum required predetermined trust level of the service, intimation on the same will be sent to the user about the insufficiency of trust level. A user can request additional users through an adding additional user unit 617 to join with him while requesting access in the desired service. Thereafter, the additional user can approve his request (box 11) through 617 or can reject it through 617. The service unit 619 comprises various data or information or applications where an authorized user can execute various enabled functions thereon.

EXAMPLE 1

In a banking environment, there are various services offered such as cash transactions, credit offering, issuance of demand drafts (DD), offering of various kinds of loans (home loan, personal loan), and the like. Considering the case of issuance of DD herein. Assuming that an account is authorized to issue a DD of $1500 while a senior manager is authorized to issue a DD of amount of $5000. In present system, the issuance of amount of DD is linked to the trust level provided to the DD generating system by the user. For more simplicity, first let us have a look on tables shown below.

TABLE 1

| Entity (Demand Draft) | Amount ($) | Trust level assigned | Maximum number of users jointly allowed to access request |
|---|---|---|---|
| DD1 | 1500 | 10 | 2 |
| DD2 | Up to 5000 | 35 | 3 |

The table 1 represents a method of issuance of DDs of various dominations and the constraints applied thereof. For example, to issue a DD1 of $1500, a minimum of trust level "10%" should be provided to the DD generating system while to issue a DD2 of $5000, a minimum trust level "35%" should be provided to the DD generating system. The table 1 also represents that in issuing the DD1 a maximum of two users are allowed to combine and to provide the trust level to the DD generating system thereof while in issuing DD2 a maximum of three users are allowed to combine and to provide the trust level to the DD generating system thereof.

Now, consider another table,

TABLE 2

| Role | Trust level assigned to the user's password | Strength of employees |
|---|---|---|
| Senior Manager | 40 | 1 |
| Manager | 17 | 2 |
| Accountant | 10 | 4 |
| Clerks | 3 | 10 |

The table 2 indicates that a senior manager is assigned with a trust level of 40%, a manager is assigned with a trust level of 17%, an accountant is assigned with a trust level of 10%, and a clerk is assigned with a trust level of 3%. The table also indicates that the bank comprises one senior manager, two managers, four accountant, and ten clerks.

Therefore, an account is authorized to issue a DD of $1500 as he is able to provide a trust level of 10% as required by the DD generating system. A manager or a senior manager is also authorized to issue a DD of $1500 as they hold trust level higher than minimum required trust level; however, a clerk is not authorized to issue a DD of $1500 as he is assigned with a trust level of 3% which is lesser than minimum trust level required by the DD generating system.

Now consider a scenario when a requirement of issuance of DD of $4000 has approached; however the senior manager is not available in the office who can issue a DD of $4000. The present technique provides a flexibility of combining of individual trust level of a user with other users to attain a higher trust level and authorizing the user in executing a function of higher trust level thereof. In present example, a minimum 35% trust level is required to instruct the DD generating system to generate a DD of $4000. Therefore, if requires, an account can initiate a process to combine his trust level with other users in pursuit of attaining the required minimum trust level to DD generating system to issue a DD of $4000.

Considering the strength of the bank, trust provided to each employee and the constraint of combining maximum number of users for accessing or initiating a particular function (maximum 3 members jointly allowed in present case), the accountant has the following options, as represented in TABLE 3, to attain a minimum 35% trust level:

TABLE 3

| Combinations Number | Combinations | Total trust level (40%) | Total members in requesting group |
|---|---|---|---|
| 1 | 4 accountants | 40 | 4 |
| 2 | 3 accountants + 3 clerks | 39 | 6 |
| 3 | 2 accountants + 1 manager | 37 | 3 |
| 4 | 1 accountant + 9 clerks | 37 | 10 |
| 5 | 1 accountant + 2 managers | 44 | 3 |

Even though all the combinations carry a total trust level of more than 35%, considering the constraints of generating a DD of $4000 as shown in TABLE 1—a maximum of 3 users are allowed to join together to combine their trust level and to make the request—either the combination number 3 (combination of 2 accountants and 1 manager) or the combination number 5 (combination of 1 accountant and 2 managers) is allowed to execute the function of issuing the DD of $4000.

Therefore, the present technique in the invention provides a flexibility of executing a function of higher trust level even though the user's individual trust level is lesser than the minimum required trust level of the service i.e., enabling an accountant of issuing a DD of $4000 in present example.

The present technique eliminates the requirement of tokens, pins, dongles etc. while attaining a higher trust level to perform a task which belongs to a higher trust level.

Exemplary Computing Environment

Figure 7:
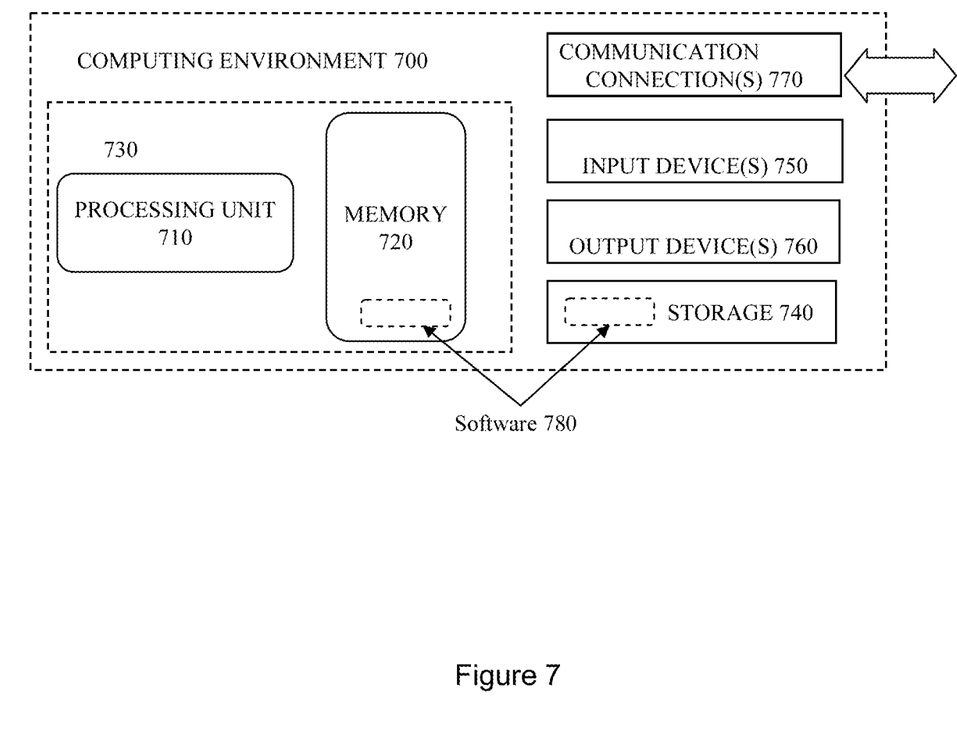
FIG. 7 is a high-level block diagram showing an environment in which the client machine is posed with the authorization challenge. The various events in the process of user login into authorized server and using its resources.

One or more of the above-described techniques can be implemented in or involve one or more computer systems. FIG. 7 illustrates a generalized example of a computing environment 700. The computing environment 700 is not intended to suggest any limitation as to scope of use or functionality of described embodiments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. In some embodiments, the memory 720 stores software 780 implementing described techniques.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, CD-RWs, DVDs, or any other medium which can be used to store information and which can be accessed within the computing environment 700. In some embodiments, the storage 740 stores instructions for the software 780.

The input device(s) 750 may be a touch input device such as a keyboard, mouse, pen, trackball, touch screen, or game controller, a voice input device, a scanning device, a digital camera, or another device that provides input to the computing environment 700. The output device(s) 760 may be a display, printer, speaker, or another device that provides output from the computing environment 700.

The communication connection(s) 770 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 700, computer-readable media include memory 720, storage 740, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

The invention claimed is:

1. A computer implemented method of authorization to access in a service, wherein the service has an associated predetermined threshold trust level defined to access in the service, the computer implemented method comprising:
   defining, by executing software, elements and length of a first password, wherein each element of the first password includes a pair of sub-elements, further wherein the sub-elements are in an exclusivity relationship;
   assigning, by executing software, at least one second password to at least one user to access in the service, wherein constituents of the second password includes one sub-element from the pair of the sub-elements associated with at least one element of the first password, further wherein length of the second password is based on a trust level of the at least one user, the trust level of the at least one user represents a numeral value that enables the at least one user to execute the services or functions enabled for that trust level, and wherein each of the at least one user is assigned a different second password;
   operating, by executing software, the exclusivity relationship upon each constituent of the second password with a second sub-element from the pair of the sub-elements associated with the at least one element of the first password and generating a value of '1' for a constituent of the second password if the constituent of the second password is in the exclusivity relationship with the second sub-element, and generating a score thereof wherein at least two users are requesting jointly to access in the service;
   calculating, by executing software, a score for the second password by summing the generated values '1', wherein the score for the second password corresponds to the trust level of the at least one user; and
   combining the scores, by executing software, for the at least two or more users and attaining a combined trust level, wherein the access in the service is allowed if the trust level of the at least two or more users is higher than or equal to the predetermined threshold trust level of the service otherwise the access in the service is denied, wherein the combined trust level is a ratio of the combined scores to the length of the first password.

2. The method of authorization to access in a service according to claim 1, further comprising:
   determining maximum number of users to create a trust level wherein the maximum number of users to create a trust level depends on the type of the service to perform;
   verifying number of the users requesting to access in a service,
   wherein if the maximum number of members creating a trust level is lesser than or equal to predetermined maximum number of users for access in the service, the members are allowed to proceed for subsequent steps,
   else if the maximum number of members creating a trust level exceeds predetermined maximum number of users to access in the service, the members are not allowed to proceed for subsequent steps;
   calculating the scores if the users are allowed to access in the services; and
   combining scores of at least two or more users requesting access in the service and generating a trust level thereof, wherein the access in the service is allowed if the trust level is higher than or equal to a predetermined threshold trust level of the service otherwise the access in the service is denied.

3. The method of authorization to access in a service according to claim 2, wherein the maximum number of users to create a trust level is predetermined.

4. The method of authorization to access in a service according to claim 1, wherein the users requesting the access in the service belong to equivalent or different hierarchy levels or combinations.

5. The method of authorization to access in a service according to claim 1, wherein the elements of the first password are alphanumeric.

6. The method of authorization to access in a service according to claim 1, wherein the constituents of the second password are alphanumeric.

7. The method of authorization to access in a service according to claim 1, wherein the exclusivity relationship is such that sum of integer value of the sub-elements from the pair of sub-elements matches integer value of the associated element of the first password.

8. The method of authorization to access in a service according to claim 1 further comprising storing in a database, the second sub-element from the pair of the sub-elements associated with the at least one element of the first password.

9. The method of authorization to access in a service according to claim 1 further comprising prior to combining the scores for the at least two or more users performing one of:
   providing access in the service if the trust level of the at least one user is higher than or equal to the predetermined threshold trust level of the service and denying access in the service if the trust level of the at least one user is less than the predetermined threshold trust level of the service,
a program code adapted for combining the scores for the at least two or more users and attaining a trust level, wherein the access in the service is allowed if the trust level of the at least two or more users is higher than or equal to a predetermined threshold trust level of the service otherwise the access in the service is denied.

10. A system of authorization to access in a service, wherein the service has an associated predetermined threshold trust level defined to access in the service, the system comprising:
a first password module configured to define elements and length of a first password wherein each element of the first password includes a pair of sub-elements, further wherein the sub-elements are in an exclusivity relationship;
a second password module configured to assign at least one second password to at least one user wherein constituents of the second password include one sub-element from the pair of the sub-elements associated with at least one element of the first password, further wherein length of the second password is based on a trust level of the at least one user, the trust level of the at least one user represents a numeral value that enables the at least one user to execute the services or functions enabled for that trust level, and wherein each of the at least one user is assigned a different second password;
a value generating module configured to operate the exclusivity relationship upon each constituent of the second password with a second sub-element from the pair of the sub-elements associated with the at least one element of the first password and generate a value '1' for a constituent of the second password if the constituent of the second password is in the exclusivity relationship with the second sub-element, and generating a score thereof, wherein at least two user are requesting jointly to access in the service;
a score calculating module configured to calculate the ~score for the second password by summing the generated values '1', wherein the score for the second password corresponds to the trust level of the at least one user; and
a score combining module configured to combine the scores for the at least two or more users and attaining a combined trust level, wherein the access in the service is allowed if the trust level of the at least two or more users is higher than or equal to a predetermined threshold trust level of the service otherwise the access in the service is denied, wherein the combined trust level is a ratio of the combined scores to the length of the first password.

11. The system of authorization to access in a service according to claim 10, further comprising:
number of users determine module configured to determine maximum number of users to create a trust level wherein the maximum number of users to create a trust level depends on type of the service to perform;
number of users verifying module configured to verify number of the users requesting to access in a service, wherein if the maximum number of members creating a trust level is lesser than or equal to predetermined maximum number of users for access in the service, the members are allowed to proceed for subsequently steps, else if the maximum number of members creating a trust level exceeds predetermined maximum number of users to access in the service, the members are not allowed to proceed for subsequently steps;
score calculating module configured to calculate the scores if the users are allowed to access in the services; and
score combining module configured to combine scores of at least two or more users requesting access in the service and generating a trust level thereof, wherein the access in the service is allowed if the trust level is higher than or equal to a predetermined threshold trust level of the service otherwise the access in the service is denied.

12. The system of authorization to access in a service according to claim 11, wherein the number of users to create a trust level is predetermined.

13. The system of authorization to access in a service according to claim 10, wherein the users requesting access in the service belong to equivalent or different hierarchy levels or combinations.

14. The system of authorization to access in a service according to claim 10, wherein the elements of the first password are alphanumeric.

15. The system of authorization to access in a service according to claim 10, wherein the constituents of the second password are alphanumeric.

16. The system of authorization to access in a service according to claim 10, wherein the exclusivity relationship is such that sum of integer value of the sub-elements from the pair of sub-elements matches integer value of the associated element of the first password.

17. The system of authorization to access in a service according to claim 10 further comprising a storage module configured to store, in a database, the second sub-element from the pair of the sub-elements associated with the at least one element of the first password.

18. The system of authorization to access in a service according to claim 10 further comprising a trust level comparison module for performing one of prior to combining the scores for the at least two or more users: providing access in the service if the trust level of the at least one user is higher than or equal to the predetermined threshold trust level of the service and denying access in the service if the trust level of the at least one user is less than the predetermined threshold trust level of the service.

19. A computer program product comprising a non-transitory computer usable medium having a computer readable program code embodied therein of authorization to access in a service, wherein the service has an associated predetermined threshold trust level defined to access in the service, the computer program product comprising:
a program code adapted for defining elements and length of a first password, wherein each element of the first password includes a pair of sub-elements, further wherein the sub-elements are in an exclusivity relationship;
a program code adapted for assigning at least one second password to at least one user for accessing the service, wherein constituents of the second password include one sub-element from the pair of the sub-elements associated with at least one element of the first password, further wherein length of the second password is based on a trust level of the at least one user, the trust level of the at least one user represents a numeral value that enables the at least one user to execute the services or functions enabled for that trust level, and wherein each of the at least one user is assigned a different second password;
a program code adapted for operating the exclusivity relationship upon each constituent of the second password with a second sub-element from the pair of the sub-elements associated with the at least one element of the first password, generating a value of '1' for a constituent of the second password if the constituent of the second password is in the exclusivity relationship with the second sub-element, and a program code adapted for calculating the score for the second password by summing the generated values '1', wherein the score for the second password corresponds to the trust level of the at least one user; and a program code adapted for combining the scores for the at least two or more users and attaining a combined trust level, wherein the access in the service is allowed if the trust level of the at least two or more users is higher than or equal to a predetermined threshold trust level of the service otherwise the access in the service is denied, wherein the combined trust level is a ratio of the combined scores to the length of the first password.

20. The computer program product of claim 19 further comprising:

a program code adapted for determining maximum number of users to create a trust level wherein the maximum number of users to create a trust level depends on the type of the service to perform;

a program code adapted for verifying number of the users requesting to access in a service, wherein if the maximum number of members creating a trust level is lesser than or equal to predetermined maximum number of users for access in the service, the members are allowed to proceed for subsequent steps, else if the maximum number of members creating a trust level exceeds predetermined maximum number of users to access in the service, the members are not allowed to proceed for subsequent steps;

a program code adapted for calculating the scores if the users are allowed to access in the services; and a program code adapted for combining scores of at least two or more users requesting access in the service and generating a trust level thereof, wherein the access in the service is allowed if the trust level is higher than or equal to a predetermined threshold trust level of the service otherwise the access in the service is denied.

* * * * *